United States Patent [19]

Inoue

[11] Patent Number: 4,590,352
[45] Date of Patent: May 20, 1986

[54] DRY-CUT EDM WITH DEBRIS SWEEPING MEANS

[75] Inventor: Kiyoshi Inoue, Tokyo, Japan

[73] Assignee: Inoue-Japax Research Incorporated, Yokohama, Japan

[21] Appl. No.: 549,928

[22] Filed: Nov. 8, 1983

[30] Foreign Application Priority Data

Nov. 11, 1982 [JP] Japan .................. 57-198383

[51] Int. Cl.⁴ .................. B23H 1/00; B23H 7/38
[52] U.S. Cl. .................. 219/69 M; 15/21 R; 51/273; 204/129.1; 219/69 R; 219/69 D
[58] Field of Search .............. 219/69 M, 69 D, 69 R, 219/69 E, 69 V; 204/129.1, 129.2, 129.35, 129.46, 129.5, 129.7, 129.75, 224 M; 210/712, 713; 51/273; 15/21 R

[56] References Cited

U.S. PATENT DOCUMENTS

| | | | |
|---|---|---|---|
| 2,427,588 | 9/1947 | Burnett | 219/69 E |
| 2,944,465 | 7/1960 | Jones | 51/273 |
| 3,167,260 | 1/1965 | Gibbons et al. | 51/273 |
| 3,460,294 | 8/1969 | Stumpf | 51/273 |
| 3,476,662 | 11/1969 | Inoue | 51/273 |
| 3,600,546 | 8/1971 | Niwa et al. | 219/69 D |
| 3,626,137 | 12/1971 | Bertolasi | 219/69 D |
| 4,208,256 | 6/1980 | Inoue | 219/69 D |

FOREIGN PATENT DOCUMENTS

| | | | |
|---|---|---|---|
| 2627859 | 12/1977 | Fed. Rep. of Germany | 219/69 V |
| 52-56492 | 5/1977 | Japan | 219/69 D |
| 56-45331 | 4/1981 | Japan | 219/69 D |
| 7902492 | 10/1980 | Netherlands | 51/273 |
| 661846 | 11/1949 | United Kingdom . | |
| 972285 | 10/1964 | United Kingdom | 51/273 |
| 2074074A | 10/1981 | United Kingdom | 219/69 D |
| 682347 | 8/1979 | U.S.S.R. | 219/69 D |
| 884926 | 12/1981 | U.S.S.R. | 204/129.46 |

Primary Examiner—C. L. Albritton
Assistant Examiner—Geoffrey S. Evans
Attorney, Agent, or Firm—Karl F. Ross; Herbert Dubno

[57] ABSTRACT

An EDM system in which a tool electrode is spacedly juxtaposed with a workpiece to define a machining gap which is substantially open directly to a region of atmospheric air. A non-inflammable (e.g. water-based) machining liquid is injected into the machining gap while electrical discharges are effected therein to electroerosively remove stock from the workpiece and to permit the injected liquid to be at least partially decomposed with a resultant formation of machining products which, growing in amount, are accumulated in a pile as debris on a surface of the workpiece adjacent the machining gap. A brush is provided to sweep the debris, and to substantially remove the piled machining products adjacent the machining gap.

14 Claims, 3 Drawing Figures

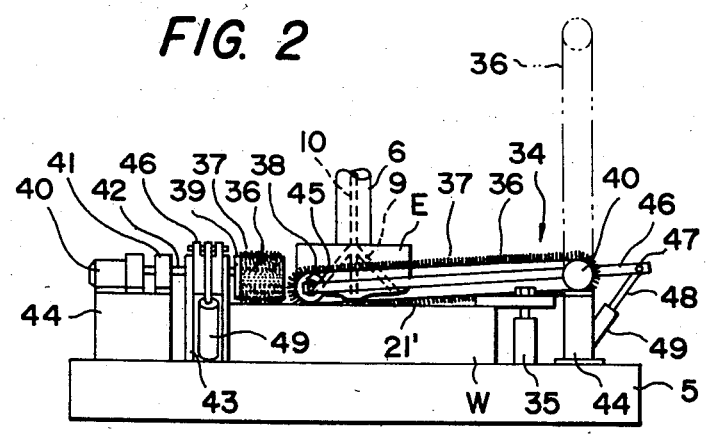
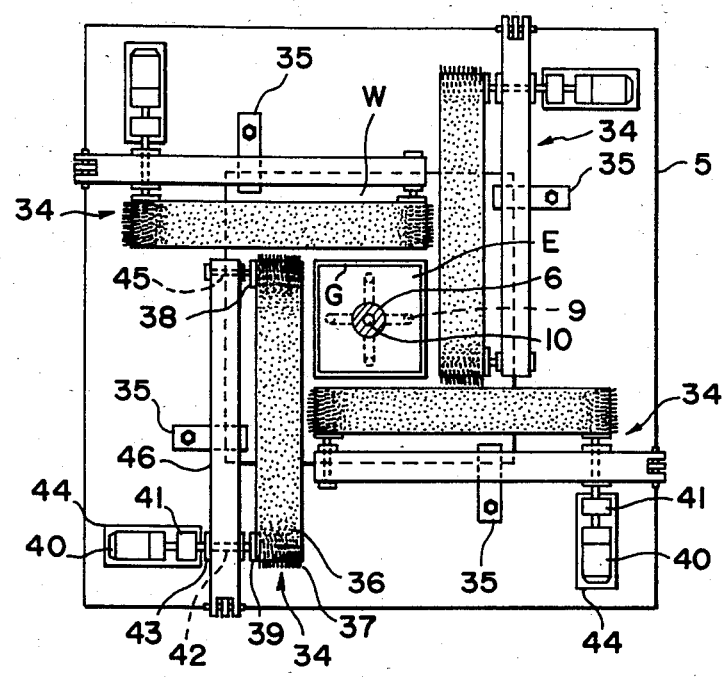

DRY-CUT EDM WITH DEBRIS SWEEPING MEANS

FIELD OF THE INVENTION

The present invention relates to electrical discharge machining (EDM) and, more particularly, to a novel and improved EDM method of and apparatus for machining an electrically conductive workpiece with a tool electrode, e.g. to form a cavity in the workpiece by means of the tool electrode which has a machining surface of a substantial area which is complementary in shape with the cavity to be formed.

BACKGROUND OF THE INVENTION

An EDM process of this type has commonly been carried out in the past in a dielectric fluid such as kerosene (paraffin) or transformer oil retained in a worktank. A workpiece is deeply immersed in the dielectric fluid in the worktank and a tool electrode is also dipped into the dielectric fluid and spacedly juxtaposed with the workpiece. The machining gap defined between the tool electrode and the workpiece is thus deeply immersed in the dielectric fluid in the worktank. A succession of electrical discharges are effected between the tool electrode and the workpiece across the machining gap to electroerosively remove stock from the workpiece. As stock removal proceeds, the tool electrode is advanced into the workpiece until the required depth of a desired cavity is reached.

While the conventional method described has been found to be generally satisfactory and acceptable for commercial purposes, there is consistent desire to increase removal rate and in general, machining efficiency. In addition, it should be noted that the dielectric fluid of the type described is highly flammable so that a number of measures are required to prevent a fire and to fight a fire if it happens to occur. On the other hand, in wire-cut EDM, a type of EDM quite different in machining mode from cavity-sinking EDM, it has been the common practice to employ as the machining fluid pure or distilled water which is not inflammable at all. Thus, attempts have been made to employ the pure or distilled water machining fluid in the cavity-sinking EDM process. It has proved, however, that the cavity-sinking efficiency obtained with the water fluid is much inferior to that obtainable with kerosene or transformer oil.

OBJECTS OF THE INVENTION

The present invention seeks to provide a new and improved EDM method of the type described which method is entirely free from the danger of a fire and yet enables cavity sinking with an efficiency comparable with or even superior to that attainable with kerosene or transformer oil.

The present invention also seeks to provide a novel and improved EDM apparatus or arrangement for carrying out the new EDM method described.

SUMMARY OF THE INVENTION

In accordance with the present invention there is provided, in a first aspect thereof, an EDM method of machining an electrically conductive workpiece, which method comprises: spacedly juxtaposing a tool electrode with the workpiece to define a machining gap therebetween so as to be substantially open directly to a region of atmospheric air; injecting a non-inflammable machining liquid into the machining gap and effecting electrical discharges therein to electroerosively remove stock from the workpiece and to permit the injected liquid to be at least partially decomposed with a resultant formation of machining products in the gap whereby the machining products grow in amount and are ejected out of the gap into the said region from a pile of the debris growing in size on a surface of the workpiece adjacent to the machining gap; and sweeping the growing debris with brush means to substantially remove the piled products from the said surface.

Specifically, the machining liquid is a water-based liquid, and the workpiece may be disposed in a worktank so as to be surrounded by atmospheric air in said region. Alternatively, the workpiece may be disposed in a worktank filled with a volume of the water liquid such as to barely cover the workpiece disposed therein. Then the thickness of the water liquid above the upper surface of the workpiece should preferably range between 2 mm and 10 mm.

The invention also provides, in a second aspect thereof, an EDM apparatus for machining an electrically conductive workpiece, which apparatus comprises: means for positioning a tool electrode in spaced juxtaposition with the workpiece to define a machining gap therebetween so as to be substantially open directly to a region of atmosphere; means for injecting a machining liquid into the machining gap while electrical discharges are effected therein to electroerosively remove stock from the workpiece and to permit the injected liquid to be at least partially decomposed with a resultant formation of machining products in the gap whereby the machining products grow in amount and are ejected out of the gap into the said region from a growing pile of debris on a surface of the workpiece adjacent to the machining gap and; brush means for sweeping the growing debris to substantially remove the piled products from the said surface.

BRIEF DESCRIPTION OF THE DRAWING

These and other features of the present invention as well as advantages thereof will become more readily apparent from a reading of the following description when taken with reference to the accompanying drawing in which:

FIGS. 2 and 3 are side and top-plan views, respectively, diagrammatically illustrating an EDM arrangement according to the invention, incorporating another embodiment of the debris removing means.

SPECIFIC DESCRIPTION

Figure 1:
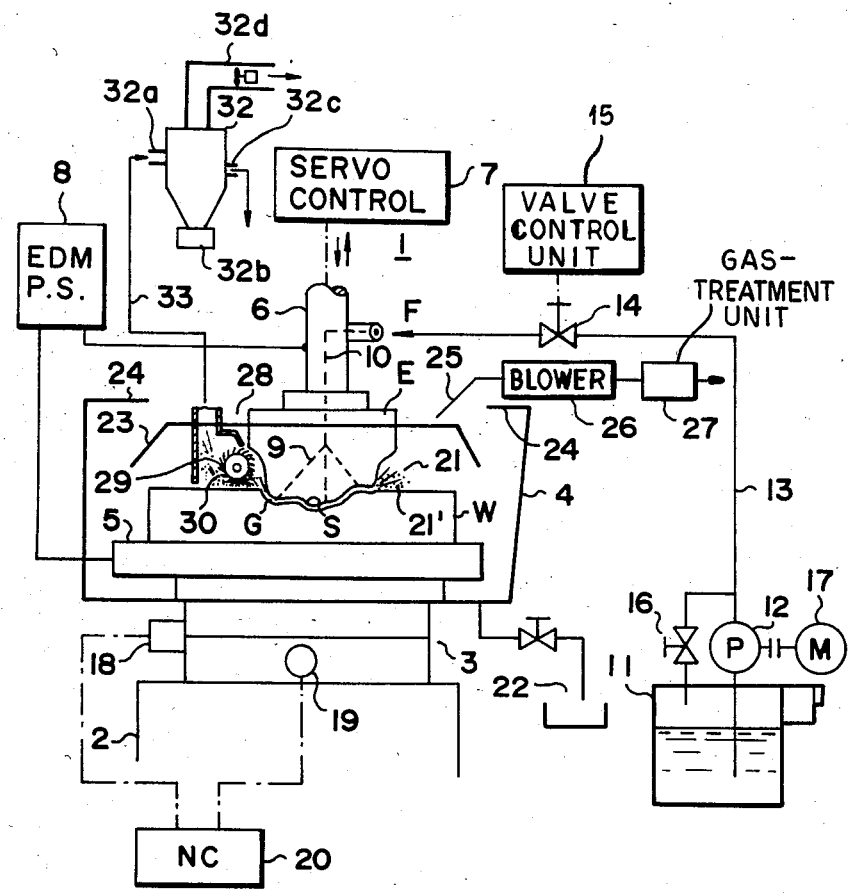
FIG. 1 is a view, partly side-elevation and partly schematic, illustrating an embodiment of the present invention including means for removing machining product debris on a workpiece surface adjacent the machining gap.

Referring now to FIG. 1 there is shown an EDM apparatus 1 embodying the present invention. It has been found that the present invention is particularly advantageous for use in a sinking EDM process for forming a cavity of a substantial surface area, e.g. in excess of 2 $cm^2$. The apparatus 1 shown includes a machine bed 2 on which is mounted a cross-table 3 designed to carry thereon a worktank 4 displaceably in a horizontal or X-Y plane. In the worktank 4 an electrically conductive worktable 5 is secured in position to mount a workpiece W fixedly thereon. The workpiece W is shown as being machined with a tool electrode E in a method according to the present invention. The tool electrode E has a machining surface S (of an area, e.g. in excess of 2 cm$^2$) spacedly juxtaposed with the workpiece W across an EDM gap G and shaped to be complementary to the contour of a cavity to be machined in the workpiece W. The tool electrode E is carried by a vertical stem 6 designed to be moved vertically up and down by a drive unit 7. The latter includes a servomechanism responsive to a gap variable, e.g. voltage across the machining gap, for displacing the tool electrode E so as to maintain the machining gap G substantially constant. Preferably, the drive unit 7 also includes an electrode reciprocation mechanism for intermittently retracting the tool electrode E while it is being fed by the servomechanism. The tool electrode E is electrically connected via the conductive stem 6 to one output terminal of an EDM power supply 8 whose other output terminal is electrically connected to the workpiece W via the conductive worktable 5.

Furthermore, the tool electrode E has a plurality of internal bores 9 respectively open to the machining gap G at spaced-apart locations on the electrode machining surface S. The internal bores 9 at their source sides merge into an inlet passage 10 which passes through the stem 6 for reception of a non-inflammable machining fluid F from a reservoir 11. A pump 12 is provided to draw the machining fluid F from the reservoir 11 and feeds it through a conduit 13 into the fluid inlet 10. A valve 14 is provided in the conduit 13 and is regulated by a control unit 15 to control the volume flow rate of the fluid F supplied into the machining gap G through the internal bores 9. A further valve 16 is provided to return a portion of the fluid F drawn by the pump 12 into the reservoir 11 and may be regulated to control the delivery pressure of the machining fluid F supplied into the EDM gap G. The pump 12 is driven by a motor 17.

The machining fluid F should, in the practice of the present invention, be constituted by a water-based liquid which is essentially not flammable but which preferably excludes the use of pure or distilled water alone. Thus, the machining liquid F preferably contains a small proportion, say 0.1 to 5% by weight, of an organic substance, possibly also a small proportion, say, 0.1 to 5% by weight, of a hydrocarbon such as kerosene or transformer oil and the balance water. The water should preferably have a specific resistance ranging between $10^3$ and $10^5$ ohm-cm. The organic substance may be solid, say, in a powdery form but preferably is a water-soluble organic liquid which is further preferably a non-ionic surface active agent. One preferred example of the water-soluble organic substance for use here is a silicone oil and specifically a polyether denaturated silicone oil. Other examples of the water-soluble organic substance for use here include ethylene glycol, polyethelene glycol, propylene glycol, glycerin, diethylene glycol, polyalkyl ether and a higher (fatty) alcohol.

The cross-table 3 is driven by an X-axis motor 18 and a Y-axis motor 19 to displace the worktank 4 and hence the worktable 5 secured therein to position the workpiece W in an X-Y planar or horizontal coordinate system relative to a vertical axis of the tool electrode E or the longitudinal axis of the stem 6. The motors 18 and 19 may also be driven to translationally displace the workpiece W along a preselected orbital path in the X-Y plane in a finish-machining step. Thus, the tool electrode E and the workpiece W, in a first or rough-machining step, are relatively displaced by the drive unit 7 to cause the tool electrode E to penetrate into the workpiece W until the required depth of the cavity is reached and, in a second or finish-machining step, are relatively displaced by the motors 18 and 19 to cause the tool electrode effectively to move translationally in the X-Y plane perpendicular to the direction of the penetration. Preferably, both for positioning and translational displacement of the workpiece W, the motors 18 and 19 are driven under the commands of a numerical controller 20.

In accordance with an important feature of the present invention, it is essential that the machining gap G defined between the tool electrode E and the workpiece W be held substantially opening or contiguous to a region of atmospheric air in the worktank 4, unlike the conventional arrangement in which the machining gap G is deeply immersed in the machining fluid or located deeply below the surface thereof in the worktank.

Under the stated or open to air gap condition, the machining fluid F in the method according to the present invention is supplied at a sufficient volume flow rate, preferably between 10 and 1000 cc/min, and more preferably from 5 to 500 cc/min, into the machining gap G from the reservoir 11 and is allowed to pass or splash directly into the atmospheric air from the machining gap G. A succession of electrical pulses are applied from the EDM power supply 8 between the tool electrode E and the workpiece W to effect discrete, time-spaced electrical discharges across the machining gap G in the presence of the machining fluid F, thereby electroerosively removing material from the workpiece W. The splashing machining fluid F carrying therein the gap EDM products and sparks is illustrated and designated by numeral 21.

The splashes 21 of the machining fluid F out of the EDM gap are eventually allowed to fall by gravity directly onto the floor of the worktank 4 and, also first directly on the workpiece W and, flowing thereon, then to fall onto the floor of the worktank 4. The fluid F then flows down out of the worktank 4 into a drain unit or sump 22.

Disposed to overlie the tool electrode E and the workpiece W within the worktank 4 is a cover 23 in the form of a downwardly open box or umbrella (hood) to collect the spent machining fluid F, the gap EDM products and sparks splashing from the machining gap G. These material collected by the cover 23 are allowed to fall by gravity partly onto the workpiece W and partly onto the floor of the worktank 4 and thence to flow down out of the worktank 4 into the drain unit 22. The worktank 4 has its wall sufficiently high so that the machining gap G is located sufficiently below the top thereof so that the splashes altogether are collected therein. To ensure this, there is further provided an inwardly projecting guard 24 around the top of the worktank 4. In addition, gases and mists evolving from the machining gap G and escaping the covering 23 are collected into a ventilator 25 communicating with a blower 26. The blower 26 is used to draw the gases and mists out of the worktank 4. A gas-treatment unit 27 may be provided to filter and treat these gases and mists for their disposal or emission upon being rendered harmless.

The tool electrode E may be composed of copper, a copper alloy or of a tungsten alloy as is conventional but, it has been found that it should preferably be composed of carbon (graphite) or a sintered carbon (graphite) and metal (e.g. copper or iron) mixture. It has been found in general that an electrode material having higher heat-capacity or less heat-conductivity is preferred.

While the EDM power supply 8 may be of the type which generates a uniform train of EDM pulses, it has been found to be preferred to employ a power supply 8 which is capable of providing a succession of time-spaced trains of electrical pulses as shown, for example, in U.S. Pat. No. 4,288,675.

The machining fluid F is supplied into the machining gap G preferably through one or more internal bores formed in the tool electrode E, although it may be supplied through one or more passages formed in the workpiece W or by means of one or more nozzles disposed in the vicinity of the machining gap G.

The machining fluid F may be supplied either continuously or intermittently into the machining gap G. Furthermore, the intermittent supply of the machining fluid F into the machining gap G may advantageously be synchronized with the reciprocation or intermittent retraction of the tool electrode E to that the machining fluid F is supplied into the machining gap G selectively during the time period in which the tool electrode E is retracted.

The apparatus 1, in accordance with a further important feature of the invention, includes means 28 for removing a debris of machining products 21 on a workpiece surface adjacent the machining gap G. The gap machining products 21 growing in amount and ejected out of the gap G into the atmospheric region tend to from a growing pile of debris 21' on surface of the workpiece W adjacent to the machining gap G. Such a debris 21' tends to form where the volume flow of the machining liquid F injected in the gap G is to be limited. When the debris 21' forms, further machining products in the gap G are blocked, prevented from smooth ejection into the atmospheric region, and hence forced to remain in the machining G, causing a short-circuiting condition therein. Furthermore, the machining discharge current tends to shunt through the debris 21' so that undesirable stray machining results in the workpiece W.

The debris removal means 28 shown comprises a rotary drum 29 having electrically nonconductive bristles, generally tough and flexible elements, 30 formed on or embedded on its peripheral surface. The drum 29 is rotated about its horizontally extending shaft by a motor (not shown) to broom or brush the debris 21' with the elements 30 in a receptacle or duct 31 which is placed under suction and communicates with a cyclone or separating device 32 via a conduit 33. Thus, the machining products 21 brushed and scraped off the workpiece surface are carried in a fluidized state under suction into the cyclone 32 through its inlet 32a and, in the cyclone, are separated into solid, liquid and gaseous components which are recovered to a collector 32b, discharged through an liquid outlet 32c and vented through a gas outlet 33d, respectively. The elements 30 forming the broom or brush may be magnetized elements to facilitate removal of ferromagnetic components in the debris 21'. Thus, each element may be one composed of a synthetic resin and having permanent-magnet particles distributed therein. Instead of permanent-magnet particles, magnetizable particles may be distributed for magnetization by an external electromagnet or permanent magnet which may be arranged in the brushing means 28. The brushing means 28 is preferably arranged to be rotatable about the machining gap G to ensure complete removal of debris 21' on the workpiece surface.

EXAMPLE I

Using a graphite tool electrode having a specific resistance of $3.0 \times 10^3$ ohm-cm, a workpiece W composed of SKD-11 (Japanese Industrial Standard) was machined in a first run according to the conventional EDM mode and in a second run using the novel EDM arrangement generally shown in FIG. 1. In each run, the tool electrode was poled positive and the workpiece was poled negative. The machining gap defined between the tool electrode and the workpiece had a maximum area of 50.24 cm$^2$. Machining conditions were fixed so as to yield a surface roughness of 50 to 60 μmRmax on the machined workpiece with a relative electrode wear of 1 to 2%.

In the first run, with the conventional EDM arrangement, the machining gap defined between the tool electrode and the workpiece was deeply immersed in a dielectric fluid which was constituted by a hydrocarbon oil of the kerosene family commonly available at a gasoline (petrol filling) station. Machining proceeded at an average removal rate of 2.5 g/min. Since the machining fluid was an inflammable liquid, care had to be exercised to avoid a possible fire.

In the second run, the machining fluid was constituted by a water-based liquid consisting of 1% by weight of a water-soluble silicone oil, specifically a polyether denaturated silicone oil, and the balance essentially pure or distilled water having a specific resistance of $3 \times 10^4$ ohm-cm. Such a liquid is not inflammable at all. The machining liquid was supplied into the machining gap at a volume flow rate of 50 to 100 cc/min. It was found that machining proceeded at an average removal rage of 3.9 g/min., that is more than 50% greater than that obtained by the conventional EDM method to achieve the same surface finish with the same electrode wear ratio.

From the tests above it is seen that not only is the EDM method according to the foregoing novel mode completely free from fire hazard but it provides much greater machining efficiency than the conventional EDM method described.

Referring to FIGS. 2 and 3 in which the same reference numerals as those used in FIG. 1 designate the same or similar components or parts, there is shown another form of the debris removal means, comprising four units 34 which are arranged respectively along four sides of a square-sectioned tool electrode E. A workpiece W securely mounted on the worktable 5 by means of a clamp 35 is shown as being machined in a mode as previously described by means of this electrode. Each unit 34 comprises an endless belt 36 having formed throughout on its outer surface tough or self-sustaining and flexible brush elements 37 in the form of feathers, bristles, strings or bands, composed of a synthetic resin such as nylon. The belt 36 is supported on a pair of rollers one of which 38 is freely rotatable and the other of which 39 is rotated by a motor 40 via a transmission 41. The axle 42 for the roller 39 is journaled on a bracket 43 which is securely mounted on the worktable 5. The motor 40 and the transmission 41 are secured on a stand 44 which is in turn mounted on the worktable 5. That axle 42 and the axle 45 for the rotatable roller 38 are securely carried by a bracket 46 which is liftably coupled at a pin 47 with a piston rod 48 projecting from a cylinder 49, the latter being securely mounted on the worktable 5. With the piston rod 48 projected to maximum, the rotary belt assembly 36 is turned to stand upright away from the workpiece surface as indicated by a chain line 36'. With the piston rod 48 retracted into the cylinder 49, as shown, the assembly 36 is brought into brushing engagement with the workpiece surface. Each rotary brushing unit 34 operates by energizing the corresponding motor 40 to sweep a debris 21' away from the region of the machining gap G.

What is claimed is:

1. An EDM method of machining an electrically conductive workpiece, comprising the steps of:
    spacedly juxtaposing a tool electrode with said workpiece to define a machining gap therebetween so as to be substantially open directly to a region of atmospheric air;
    injecting a non-inflammable machining liquid into said machining gap and effecting electrical discharges therein to electroerosively remove stock from the workpiece and to permit said injected liquid to be at least partially decomposed with a resultant formation of machining products in the gap whereby the machining products grow in amount and are ejected out of the gap into said region and or a growing pile of debris on a surface of the workpiece adjacent to said machining gap; and
    sweeping said growing pile of debris with brush means separate and distinct from said electrode in the form of a brush with bristles to substantially remove said piled products from said surface.

2. The method defined in claim 1 wherein said workpiece is machined to form a cavity therein and said tool electrode has a machining surface complementary in shape with said cavity.

3. The method defined in claim 2 wherein said machining surface has an area in excess of 2 cm².

4. The method defined in claim 1 wherein said machining liquid is a water liquid.

5. The method defined in claim 4 wherein said water liquid is injected into said machining gap at a volume flow rate ranging between 10 and 1000 cc/min.

6. The method defined in claim 4 wherein said workpiece is disposed in a worktank so as to be surrounded by atmospheric air in said region.

7. The method defined in claim 4 wherein said workpiece is disposed in a worktank filled with a volume of said water liquid such as to barely cover said workpiece disposed therein.

8. The method defined in claim 7 wherein the thickness of the water liquid above the upper surface of the workpiece ranges between 2 mm and 10 mm.

9. The method defined in claim 4 wherein said water liquid consists of 0 to 5% by weight of at least one hydrocarbon, 1 to 5% by weight of at least one organic substance other than hydrocarbons and the balance essentially water.

10. The method defined in claim 9 wherein said organic substance is at least one substance selected from the group which consists of a silicone oil, ethylene glycol, polyethylene glycol, propylene glycol, glycerin, diethylene glycol, polyalkyl ether and a higher (fatty) alcohol.

11. The method defined in claim 10 wherein said silicone oil is a polyether denaturated silicone oil.

12. The method defined in claim 9 wherein said organic substance is a non-ionic surface active agent.

13. An EDM apparatus for machining an electrically conductive workpiece, comprising:
    means for positioning a tool electrode in spaced juxtaposition with the workpiece to define a machining gap therebetween so as to be substantially open to a region of atmosphere;
    means for injecting a machining liquid into said machining gap while electrical discharges are effected therein to electroerosively remove stock from the workpiece and to permit the injected liquid to be at least partially decomposed with a resultant formation of machining products in the gap whereby the machining products grow in amount and are ejected out of the gap into said region and form a growing pile of debris on a surface of the workpiece adjacent to said machining gap; and
    brush means separate and distinct from said electrode in the form of a brush with bristles for sweeping said growing pile of debris to substantially remove said piled products from said surface.

14. The apparatus defined in claim 13 wherein said brush is a rotary brush.

* * * * *

UNITED STATES PATENT AND TRADEMARK OFFICE
CERTIFICATE OF CORRECTION

PATENT NO. : 4,590,352

DATED : 20 May 1986

INVENTOR(S) : Kiyoshi INOUE

It is certified that error appears in the above-identified patent and that said Letters Patent is hereby corrected as shown below:

Column 7, claim 1, line 15, "or" should read:

--form --  .

Signed and Sealed this

Eleventh Day of November, 1986

*Attest:*

DONALD J. QUIGG

*Attesting Officer*　　　　*Commissioner of Patents and Trademarks*